United States Patent

[11] 3,619,786

[72] Inventor Donald L. Wilcox
Richardson, Tex.

[21] Appl. No. 859,600
[22] Filed May 28, 1969
[45] Patented Nov. 9, 1971
[73] Assignee Texas Instruments Incorporated
Dallas, Tex.

[54] SOLID-STATE VHF ATTENUATOR AND TV RECEIVER
8 Claims, 8 Drawing Figs.

[52] U.S. Cl. .......... 325/411, 325/362, 325/387
[51] Int. Cl. .......... Ho4b 1/18
[50] Field of Search .......... 325/400, 411, 414, 415, 380, 387, 362; 333/81

[56] References Cited

UNITED STATES PATENTS 3,193,767 7/1965 Schultz .......... 325/319
3,272,996 9/1966 Pan .......... 307/88.5
3,495,193 2/1970 Harwood .......... 333/81

*Primary Examiner*—Robert L. Griffin
*Assistant Examiner*—Kenneth W. Weinstein
*Attorneys*—Samuel M. Mims, Jr., James O. Dixon, Andrew M. Hassell, Harold Levine, Jack A. Kanz, Kenneth R. Glaser, Gerald B. Epstein, Henry K. Woodward, Robert J. Crawford, Richards, Harris and Hubbard and V. Bryan Medlock, Jr.

ABSTRACT: Disclosed are television receivers of the type having voltage-controlled AC signal attenuators including diodes which are advantageously suitable for use as an automatic gain control in a television receiver, for example, or for attenuating any UHF or high-frequency signals. These novel attenuators, when incorporated in a television receiver, (1) substantially eliminate pole-shifting distortion by permitting the RF and IF amplifiers to be operated at one biaspoint, (2) protect the amplifier from overload by preamplification attenuation of the incoming signals, (3) improve system cross modulation, (4) permit use of field effect transistors, and (5) assure minimum degradation of the amplifier noise figure.

INVENTOR
DONALD L. WILCOX

E. Mickey Hubbard
ATTORNEY

INVENTOR
DONALD L. WILCOX

E. Mickey Hubbard
ATTORNEY

SOLID-STATE VHF ATTENUATOR AND TV RECEIVER

This invention relates generally to AC signal attenuators, and more particularly relates to a voltage-controlled solid-state VHF attenuator suitable for automatic gain control for the television receivers and other VHF applications.

Many electronic systems that the system can process a wide range of input signal amplitudes. For example, it is generally necessary to design a television receiver so that it can handle a range of signal amplitudes as great as ninety decibels if the receiver is to be used in close proximity to the transmitting station as well as in the outlying fringe areas. In order to make the receiver sensitive to the weaker signals, both the RF amplifier and the IF amplifier must be biased to have a high gain, usually a maximum gain, however, if the same high gain is used to receive the stronger signals, the amplifiers will overload and saturate, thus distorting or destroying the incoming signal.

In order to overcome this problem, previous television receivers have utilized an AGC circuit which derives a DC voltage from a point within the system that is proportional to the incoming signal strength. This AGC voltage is used to change the bias level of both the RF amplifier an the IF amplifier so as to reduce the gain of these amplifier stages as the strength of the incoming signal increases. In receiver systems utilizing vacuum tubes, this approach to the problem works reasonably well. However, in television receivers utilizing transistor amplifiers, this approach has many shortcomings because the output parameters of a transistor vary as the DC bias levels are changed, resulting in the migration of impedance poles along the omega axis of the complex-frequency plane which causes distortion of the frequency response. The increment in signal strength required to overload a transistor amplifier is relatively small and this fact accentuates the problem. Transistors specially designed so as to have a significant change in gain with a change in bias level inherently have poor cross modulation properties. In many instances, it is desirable to use field-effect transistors in the design of a transistorized television receiver, but this type of transistor has such a limited range of gain values that external attenuation is essential as a practical matter.

This invention is concerned with a novel voltage controlled solid-state attenuator which is suitable for use as an automatic gain control in a television receiver, or for attenuating any VHF signal, and with a television receiver utilizing the attenuator circuit. As a result of incorporation of the attenuator in a television receiver, the RF and IF amplifiers can be operated at one bias point so as to eliminate pole-shifting distortion. The amplifiers are protected from overload by attenuation of the input signals before application to the input of the amplifiers. The system's cross modulation is improved because transistors have better cross-modulation properties than those specifically designed for AGC applications can be used. By providing a means of attenuation external of the amplifier, the receiver can use field effect transistors. Since the attenuator has a low insertion loss, minimum degradations of the amplifier noise figure is assured. The attenuator has no moving parts and can be fabricated as an integral unit of very small size.

The voltage controlled AC signal attenuator in accordance with this invention utilizes PIN diodes which exhibit the characteristic of a current controlled variable impedance and have an impedance which decreases from a very high value to a very low value as the forward current through the diode increases from zero. One of these diodes is coupled between the input and the output by a pair of DC isolation capacitors. A series circuit comprised of a second diode, a resistor and a capacitor AC couples the input side of the first diode to ground, with the second diode in opposition to the first diode. A bias network is provided to simultaneously forward bias the first diode "on" and reverse bias the second diode "off". The signal then passes through the first diode with minimum attenuation. The DC voltage bias on the diodes is then simultaneously changed so that the current through the first diode is reduced and the current through the second diode increases. As a result, the impedance of the first diode progressively increases and the impedance of the second diode progressively decreases the progressively attenuate the signal passing through the first diode. When the current through the first diode has ceased and its impedance reaches a maximum, the current through the second diode is at the level which provides a minimum impedance. The second diode plus the resistor then provides an impedance approximating the impedance of the signal source to prevent the reflection of energy from the attenuator to the source. In accordance with another important aspect of the invention, the biasing voltage is applied through a third diode connected to the output side of the first diode and in opposition to the first diode. Large biasing resistors are also connected to apply voltages to each side of the first diode. Then as the relative voltage levels applied through either the second or third diode is changed, in the appropriate direction, the current through the second and third diodes is increased as the current through the first diode is decreased. As the impedance of the third diode decreases below the impedance of the load, additional attenuation is provided which is additive to the attenuation resulting as the impedance of the second diode decreases below the impedance of the first.

In accordance with another aspect of the invention, a television receiver is provided wherein an attenuator circuit is provided in advance of the RF amplifier and in advance of the IF amplifier. An AGC voltage is derived from a latter point in the system and used to control each of the attenuator circuits so as to provide automatic gain control.

The novel features believed characteristic of this invention are set forth in the appended claims. The invention itself, however, as well as other objects and advantages thereof, may be best understood by reference to the following detailed description of an illustrative embodiment, when read in conjunction with the accompanying drawings, wherein:

Figure 1:
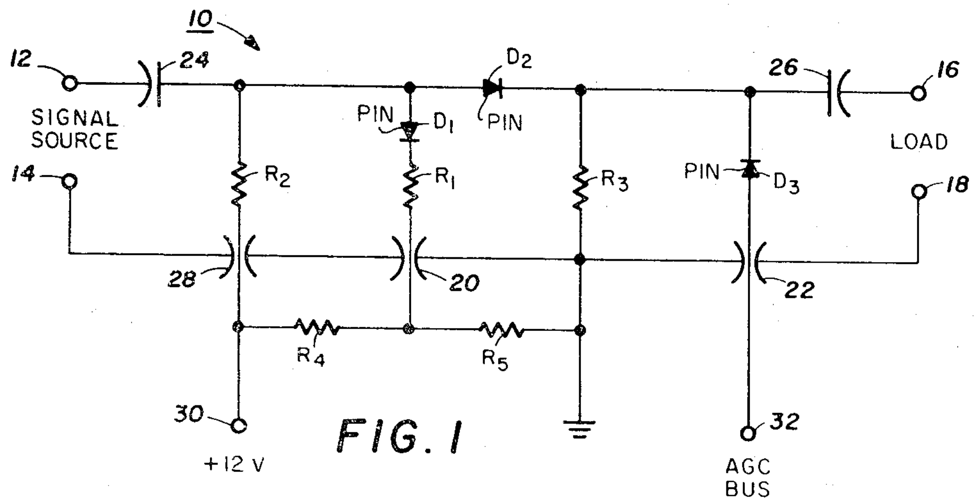
FIG. 1 is a schematic circuit diagram of an attenuator in accordance with the present invention.

Referring now to the drawings, a preferred embodiment of the invention is indicated generally by the reference numeral 10. The attenuator 10 has a pair of input terminals 12 and 14, which are connectable to a signal source. Three PIN diodes $D_1$, $D_2$ and $D_3$ are connected so that diode $D_2$ is positioned between but opposed to diodes $D_1$ and $D_3$. Each of the diodes $D_1$ –$D_3$ operates as a current controlled variable impedance in which the impedance decreases from a very high maximum to a very low minimum as the forward current through the diode increases from zero to some relatively low value, as will hereafter be described in greater detail. Diode $D_1$ is AC coupled by resistor $R_1$ and feedthrough capacitor 20 to ground. The impedance of resistor $R_1$ should be selected such that for the maximum attenuation condition, the total input impedance of the attenuation, which is primarily the impedance of the diode $D_1$ and resistor $R_1$, is approximately equal to the source impedance connected across inputs 12 and 14. Diode $D_3$ is AC coupled to ground by a feedthrough capacitor 22. The junction between diodes $D_1$ and $D_2$ is AC coupled to input 12 by a capacitor 24, which is essentially a short circuit at VHF frequencies. Similarly, the junction between diodes $D_2$ and $D_3$ is AC coupled to output terminal 16 by capacitor 26, which is essentially a short circuit at VHF frequencies. A large resistor $R_2$ and a feedthrough capacitor 28 AC couple the junction between diodes $D_1$ and $D_2$ to ground, and DC couple the junction to a positive voltage supply terminal 30. The resistor $R_1$ is connected to the center tap of a voltage divider formed by resistors $R_5$ and $R_4$. A large resistor R3 couples the junction between diodes $D_2$ and $D_3$ to ground. Feedthrough capacitor 22 DC couples diode $D_3$ to an AGC voltage bus 32.

Figure 2:
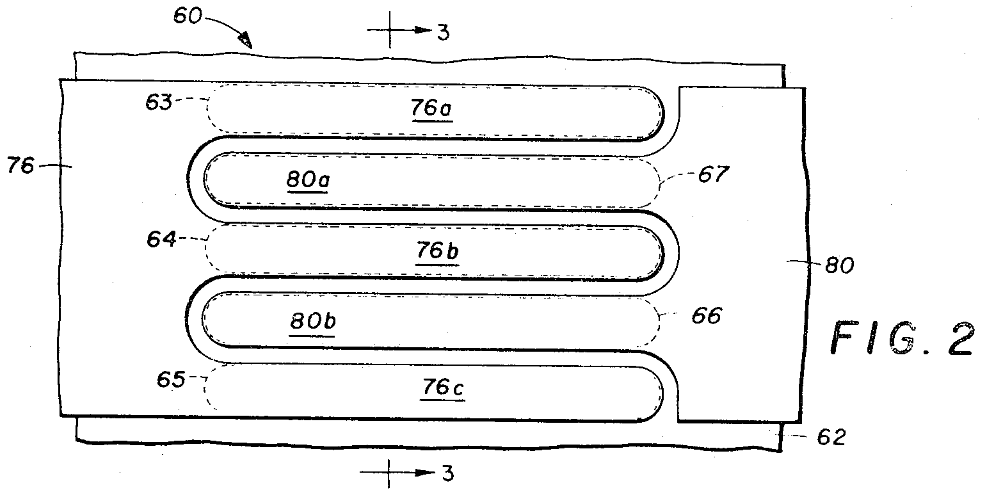
FIG. 2 is a somewhat schematic plan view of a diode suitable for use in the attenuator of FIG. 1.
Figure 3:
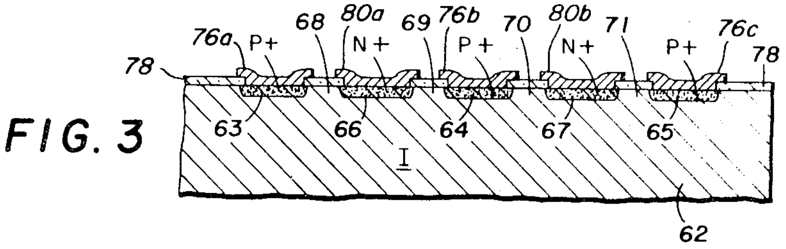
FIG. 3 is a sectional view taken substantially on lines 3—3 of FIG. 2, with the vertical dimensions greatly exaggerated with respect to the horizontal dimensions greatly exaggerated with respect to the horizontal dimensions.

As mentioned, each of the diodes $D_1$–$D_3$ has the characteristic of a current controlled impedance. This characteristic is found in a silicon PIN (P-type, intrinsic, N-type) diode in which the junction is formed by heavily doped P-type and N-type regions which are separated by a region of high resistivity intrinsic material. Such a diode is indicated generally by the reference numeral 60 in FIGS. 2 and 3. The diode is formed in a high resistivity substrate 62 which is preferably silicon, although high resistivity substrate 62 which is preferably silicon, although high resistivity gallium arsenide may also be employed. Three heavily doped P-type diffused regions 63, 64 and 65 are formed in the surface of the substrate 62. The P-type diffused regions may be formed by boron diffused to the maximum practical surface concentration, typically about $10^{19}$ atoms/cc. The diffusions are relatively shallow, being typically from about one to about twenty lines deep, each line being about 0.000011 inch deep. A heavily doped N-type diffused region 66 is formed between the P-type diffused regions 63 and 64, and a heavily doped N-type region 67 is formed between the P-type diffused regions 64 and 65. The N-type regions 66 and 67 are formed by the same N-type diffusion and are made to the same depth as the P-type diffusions. The N-type impurity may be phosphorus with a surface concentration of about $10^{20}$ atoms/cc. The diffused regions are so spaced as to leave high resistivity regions 68–71 between the adjacent edges of the P-type and N-type regions. The spaces between the edges of the diffused region are typically about 0.0003 inch wide. Contact is made with the P-type diffused regions 63–65 by the finger portions *76a*–*76c* of a metallized contact 76 which pass through openings formed in the oxide insulating layer 78 into ohmic contact with the diffused region Similarly, contact is made with the N-type regions 66 and 67 by the fingers *80a* and *80b* of a metallized film 80 which extend through openings in the oxide layer 78. The metallized films 76 and 80 may be vapor deposited at the same time and subsequently patterned using conventional techniques, and may be a laminate of gold overlying an extremely thin film of a metal having a high eutectic temperature with silicon, such as molybdenum, vanadium, platinum, nickel or tungsten. Such a laminate will prevent the eutectic intermixing of gold with the silicon which tends to cause undesirable structure.

Figure 4:
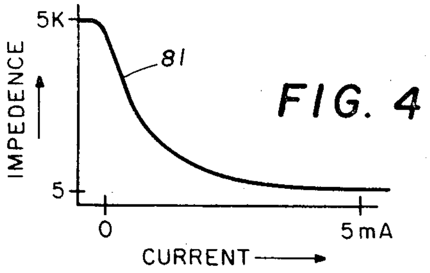
FIG. 4 is a plot generally representing the impedance of one of the diodes of the attenuator of FIG. 1 with respect to the forward current through the diode.

The diode 60 exhibits the characteristic represented generally by the curve 81 in FIG. 4. At zero forward current through the diode, the diode has a very high impedance of about 5,000 ohms. As the diode is forward biased and the current increases, the impedance decreases steadily until at about two milliamperes the impedance of the diode is about 10 ohms at VHF frequencies. The curve 81 is not reproduced with accuracy between these limits because the intermediate impedance values are not particularly significant in the operation of the attenuator 10.

Figure 5:
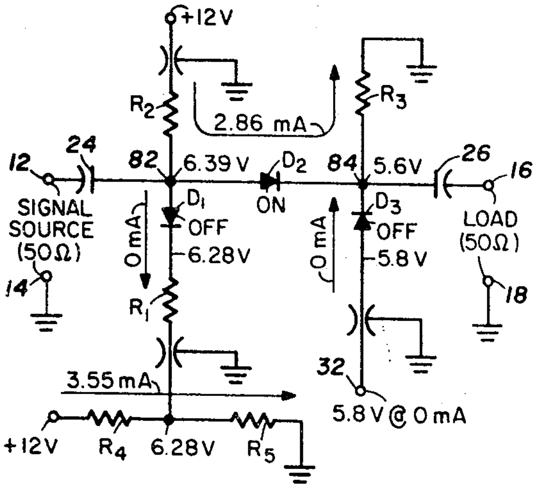
FIG. 5 is a schematic circuit diagram of one embodiment of an attenuator in accordance with this invention specifically designed for AGC application in a television tuner with the bias and current conditions for minimum attenuation.
Figure 6:
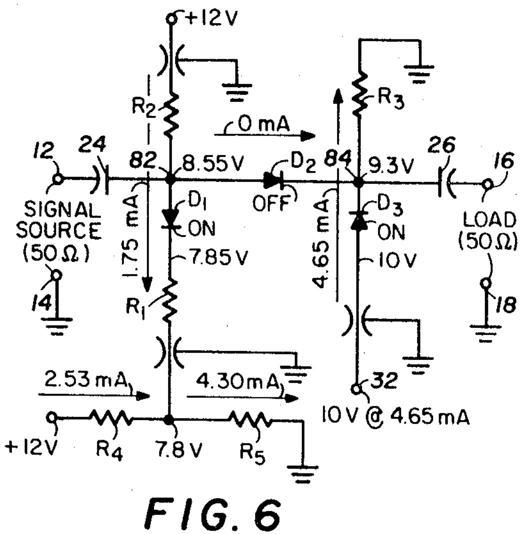
FIG. 6 is a schematic circuit diagram similar to FIG. 5 showing the current and bias conditions for maximum attenuation.

The operation of the attenuator 10 can best be understood by reference to FIGS. 5 and 6, in which the circuit has been rearranged for simplicity and give specific values suitable for an attenuator useful in television receivers. Assume that both the signal source and the load have a 50 ohm impedance, that resistors $R_2$ and $R_3$ have an impedance of 2,000 ohms, and that resistors $R_4$ and $R_5$ have impedances of about 1,600 ohms and 1,800 ohms, respectively. Assume that the AGC bus 32 is at about 5.8 volts and supplies zero milliamperes. With a +12 v. supply, the voltages at the various junctions and the currents flowing in the various branches would then be as illustrated in FIG. 5. It will be noted that there is zero current flowing through diodes $D_1$ and $D_3$ so that both diodes have a maximum impedance of about 5,000 ohms. On the other hand, about 2.85 milliamperes are flowing through diode $D_2$ so that the impedance of diode $D_2$ is approximately ten ohms. Therefore, the signal on input 12 passes through capacitor 24, diode $D_2$ and capacitor 26 with very little attenuation because the impedances of diode $D_2$ is very small when compared to the impedances of the four paths connecting junctions 82 and 84 to ground. The attenuation is a function of the ratio of the impedance of diode $D_2$ to the equivalent impedance of the parallel current paths to ground formed by resistor $R_2$ and by the series path of diode $D_1$ and resistor $R_1$, and the ratio of the impedance of the load to the equivalent impedance of the parallel branches formed by resistor $R_3$ and by diode $D_3$.

As the voltage at the AGC terminal 32 is increased, current begins to flow through resistor $R_3$, the potential at junction 84 tends to rise, which in turn tends to decrease the current through diode $D_2$, thus increasing its impedance. As the impedance of diode $D_2$ increases, the potential of junction 82 tends to rise, which in turn tends to forward bias diode $D_1$, and cause current to begin to flow through diode $D_1$ decreasing its impedance. Finally, when the potential at the AGC terminal 32 has reached about 10 volts, resulting in about 4.65 milliampers through diode $D_3$, the potential at junction 84 will be about 9.3 volts and no current will flow through diode $D_2$. This results in a potential of about 8.5 volts at junction B2 which forward biases diode $D_1$ so that about 1.75 milliamps flow through resistor $R_1$ and resistor $R_5$ to ground, with a resultant potential of 7.8 volts at the junction between resistors $R_4$ and $R_5$. As a result, the combined impedance of diode $D_1$ and resistor $R_1$ approaches 50 ohms. Since there is zero current through diode $D_2$,diode $D_2$ has an impedance of about 5,000 ohms. As a result, the ratio of the impedance milliamperes diode $D_2$ to the combined impedance of the two parallel branches formed by diode $D_1$ and resistor $R_1$, and by resistor $R_2$, is large which means that a signal at junction 84 will be much less than the amplitude of the signal at input 12. Further, the impedance of diode $D_3$ is now about ten ohms, so that the ratio of the impedance of diode $D_3$ to the impedance of the load is such that the amplitude of the signal at the output 16 is much less than the amplitude of the signal of junction 82. As a result, the signal at the output 16 is approximately 1/178 the amplitude of the signal at the input 12, which is about 45 decibels.

Figure 7:
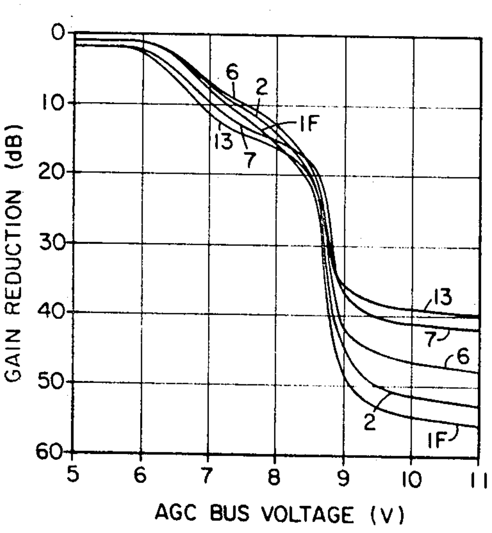
FIG. 7 is a plot of gain reduction with respect to the AGC voltage of the attenuated FIGS. 5 and 6 for frequencies of the various television channels.

Referring now to FIG. 7, the gain reduction or attenuation in decibels with respect to the AGC bus voltage produced by the attenuator 10 having the values specified in connection with FIGS. 5 and 6 on the frequencies of the various television channels is indicated in FIG. 7. It will be noted that the high band between channel 7 through channel 13 is attenuated approximately 40 *d*B, while the low band between channel 2 and channel 6 is attenuated approximately 50 *d*B for the range of AGC bus voltages between about 5.8 volts and 10 volts.

Figure 8:
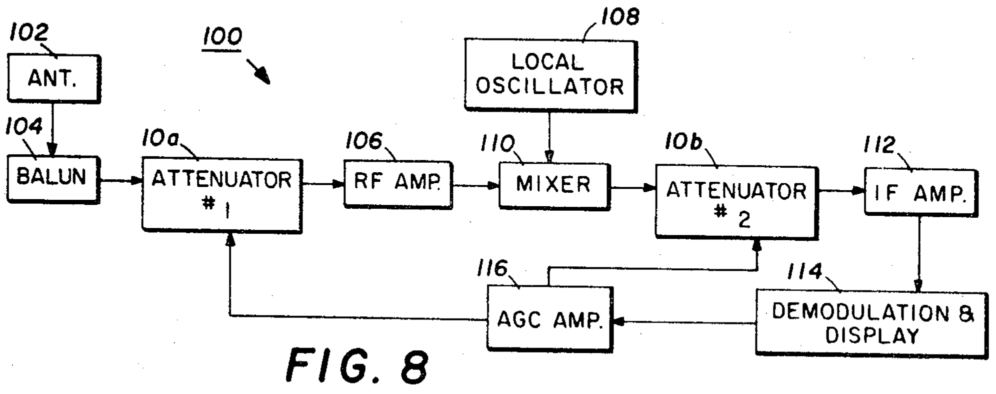
FIG. 8 is a schematic block diagram illustrating an improved television receiver utilizing the attenuator of FIGS. 5 and 6.

A VHF television receiver in accordance the present invention is indicated generally by the reference numeral 100 in FIG. 8. The television receiver 100 is comprised of a conventional antenna 102 which is connected to a conventional balun transformer 104. The output of the balun transformer 104 is connected through a first attenuator *10a* to the input of an RF amplifier 106. The output of the RF amplifier 106 and the injection voltage from a local oscillator 108 are heterodyned by a mixer 110 and the different frequency selected to produce an IF signal which is connected through a second attenuator *10b*, to the IF amplifier 112. Both attenuators *10a* and *10b* may be identical to the attenuator 10 of FIG. 1, and may have the component values specified in connection with FIGS. 5 and 6. The output of the IF amplifier 112 is then fed into the demodulation and display system 114 which may be of conventional design. A conventional automatic gain control amplifier 116 derives a signal from the demodulation and sweep circuit 114 which is a direct function of the signal amplitude at the output of IF amplifier 112. The AGC amplifier 116 then produces a voltage of about 5.8 volts for minimum attenuation when the signal amplitude at the output of the IF amplifier 112 is at the desired minimum level, and a voltage increasing to about 10 volts as the RF signal increases about ninety decibels in amplitude.

A a result, weak signals received by the antenna 102 are passed through both attenuators 10*a* and 10*b* with minimum attenuation, As the strength of the signal at the antenna 102 increases, the output from the IF amplifier 112 also tends to increase, but due to the negative feedback circuit through the AGC amplifier 116, the incoming signal is attenuated by attenuating circuits 10*a* and 10*b* thus tending to maintain the output of the IF amplifier 112 at a constant value until the maximum attenuation state is reached as illustrated in FIG. 6. As previously mentioned, the maximum range of useful television signal amplitudes is usually about ninety decibels. Attenuators 10*a* and 10*b* each provide about forty five decibels of attenuation, resulting in a total attenuation of about 90 decibels. As a result, the RF amplifier 106 and the IF amplifier 112 may be operated at constant optimum bias levels, and may be selected without regard to the necessity of being operated with a variable gain as has heretofore been required.

Although preferred embodiments of the invention have been described in detail, it is to be understood that various changes, substitutions and alterations can be made therein without departing from the spirit and scope of the invention.

What is claimed is:

1. A television receiver comprising in combination:
  a. first and second attenuator means, each including a plurality of current controlled variable impedance members having an impedance which decreases from a relatively high value to a relatively low value as the forward current through said members increases from substantially zero;
  b. balum input means for coupling AC signals to the input of said first attenuator means;
  c. RF amplifier means coupled to the output of said first attenuator means;
  d. mixer means coupled to the output of said RF amplifier means and to the output of a local oscillator means for producing selected IF signals, said mixer means having its output coupled to the input of said second attenuator means;
  e. IF amplifier means coupled to the output of said second attenuator means and having its output coupled to the input of a demodulation and display network for producing AGC signals which are direct functions of the amplitude of said IF signals; and
  f. AGC amplifier means coupled to the output of said demodulation and display network and having two output circuits respectively coupled to the inputs of said first and second attenuator means; wherein
  g. said RF and IF amplifiers are operated at a common bias point for eliminating pole-shifting distortion; and wherein
  h. said first and second attenuator means provide relatively low attenuation when said IF signals are below a predetermined level and progressively increase attenuation a the amplitude of said IF signals progressively increase.

2. The television receiver of claim 1 wherein:
  a. said current controlled variable impedance members are diodes, and wherein a first diode thereof is coupled between the input and output thereof, and second and third diodes thereof are respectively coupled between the input and output thereof and a biasing network, said biasing network being coupled to the output of said AGC amplifier means; and wherein
  b. as the bias voltage of said variable biasing network progressively varies in a predetermined manner, the forward current through said first diode progressively decreases and the forward current through said second and third diodes progressively increases; and wherein
  c. for any set of forward current conditions, the attenuation of said AC signals through said first and second attenuator means will be a function of the ratio of the resistance of said first diode to the resistance of said second diode, and of the ratio of the impedance of the output load of said first and second attenuator means to the impedance of said third diode.

3. The television receiver of claim 2 wherein the impedance of said second diode approaches the impedance of said AC signals as the impedance of said first diode becomes relatively large to prevent the reflection of energy from said first and second attenuator means.

4. The television receiver of claim 1 wherein said first and second attenuator means each include:
  a. input and output circuits;
  b. a first diode;
  c. an input isolation capacitor and an output isolation capacitor for coupling said first diode between said input and output circuits;
  d. a second diode connected between the junction of said first diode and said input isolation capacitor and a first resistor, said first resistor DC coupling said second diode to a first voltage supply and being AC coupled to ground by a feedthrough capacitor;
  e. a second resistor coupled between the junction of said first and second diodes and a second voltage supply and being AC coupled to ground by a feedthrough capacitor;
  f. a third diode connected between the junction of said first diode and said output isolation capacitor and a third voltage supply, said third diode being AC coupled to ground by a feedthrough capacitor;
  g. a third resistor coupled between the junction of said first and third diodes and a fourth voltage supply, said resistor being DC coupled to ground wherein;
  h. when said first diode is biased forward and said second and third diodes are biased off, said first and second attenuator means provide minimum attenuation; and wherein
  i. when said first diode is biased off and said second and third diodes biased forward, said first and second attenuator means provide maximum attenuation.

5. The television receiver of claim 1 wherein said first and second attenuator means each include;
  a. input and output circuits;
  b. first, second, and third diodes, each having an impedance which decreases from a maximum to a minimum value as the forward current through said diodes increases from zero;
  c. said first and second diodes having common terminals connected together to form an input junction;
  d. said second and third diodes having common terminals connected together to form an output junction;
  e. first and second AC coupling means respectively coupling said first and third diodes to ground;
  f. first and second DC isolation means respectively coupling said input and output junctions to said input and output circuits; and
  g. a biasing network including at least one variable bias voltage terminal connected so as to
    1. bias said first and third diodes to zero forward current, and
    2. bias said second diode to a forward current value that provides minimum impedance when said bias terminal is at one voltage level; wherein
  h. when the bias voltage at said one terminal varies in a predetermined manner, the forward current through said second diode progressively decreases and the forward current through said first and third diodes progressively increases; and wherein
  i. for any set of forward current conditions the attenuation of said AC signals through said attenuator means will be a function of the ratio of the resistance of said second diode to the resistance of said first diode and of the ratio of the impedance of said output circuit to the impedance of said third diode.

6. The television receiver of claim 5 wherein said first, second and third diodes are PIN diodes.

7. The television receiver of claim 5 wherein:

a. said first and second AC coupling means each include a feedthrough capacitor;

b. said first and second DC isolation means each include a coupling capacitor; and c. said biasing network includes;

1. first and second voltage supplies respectively connected to said first and third diodes, 2. a first resistor coupled between the junction of said first and second diodes and a third voltage supply, 3. a second resistor coupled between the junction of said second and third diodes and a fourth voltage supply, wherein 4. said first resistor and said first and third diodes are each AC coupled to ground; and wherein d. said first, second and third diodes can be selectively biased by selectively varying said first, second, third and fourth voltage supplies.

8. The television receiver of claim 5 wherein variation of said second voltage supply proportionately varies the attenuation characteristics of said first and second attenuator means.

* * * * *